United States Patent [19]

Ohta et al.

[11] 4,330,883
[45] May 18, 1982

[54] SYSTEM AND METHOD OF OPTICAL INFORMATION STORAGE IN A RECORDING DISC

[75] Inventors: Takeo Ohta, Nara; Nobuo Akahira, Yahata; Tatsushi Nakamura, Neyagawa; Tadaoki Yamashita, Hirakata, all of Japan

[73] Assignee: Matsushita Electric Industrial Co., Ltd., Kadoma, Japan

[21] Appl. No.: 76,725

[22] Filed: Sep. 18, 1979

[30] Foreign Application Priority Data

Sep. 25, 1978 [JP] Japan .................. 53-118468

[51] Int. Cl.³ .................. G11B 7/00
[52] U.S. Cl. .................. 369/100; 369/275
[58] Field of Search .................. 179/100.1 G, 100.3 V; 358/128.5, 128.6, 129, 130, 132; 365/127, 113, 122; 346/762; 369/93, 94, 100, 108, 109, 111, 121, 275

[56] References Cited

U.S. PATENT DOCUMENTS

| | | | |
|---|---|---|---|
| 3,224,333 | 12/1965 | Kolk, Jr. et al. | 365/122 |
| 3,472,575 | 10/1969 | Hunt | 365/122 |
| 3,626,386 | 12/1971 | Feinleib | 365/113 |
| 3,665,425 | 5/1972 | Feinleib | 365/113 |
| 3,747,117 | 7/1973 | Fechter | 346/76 L |
| 3,971,874 | 7/1976 | Ohta et al. | 428/432 |
| 4,069,487 | 1/1978 | Kasai et al. | 346/76 L |
| 4,097,895 | 6/1978 | Spong | 179/100.1 G |
| 4,125,860 | 11/1978 | Ishii et al. | 179/100.1 G |
| 4,233,626 | 11/1980 | Bell | 369/275 |

*Primary Examiner*—Vincent P. Canney
*Assistant Examiner*—Donald McElheny, Jr.
*Attorney, Agent, or Firm*—Cushman, Darby & Cushman

[57] ABSTRACT

A system and a method of recording information by changes of refractive index and light absorption coefficient on a thin film, and reproducing the recorded information by scanning a focussed monochromatic light along a track on a thin film of a selected thickness and letting a light component reflected at a light-incident surface of said thin film and the other light component reflected at an inside face of the opposite surface to said incident surface of the thin film interfere with each other thereby efficiently to vary intensity of reflection light.

19 Claims, 8 Drawing Figures

SYSTEM AND METHOD OF OPTICAL INFORMATION STORAGE IN A RECORDING DISC

BACKGROUND OF THE INVENTION

1. Field of the Invention

The present invention relates to an invention of a method of recording information on optical recording media and reproducing or retrieving the information therefrom.

2. Description of the Prior Art

Hitherto, for a method of recording time-sequential signals such as sound signal, video signal or data bits with a high density, so called optical video disk recording is known. The art of the known optical video disk is that light modulated by a signal strikes a plastic thin film and causes polymerization corresponding to the light intensity, the disk then being chemically etched and metal-plated. Then by using the plated disk as a stamper, a plastic thin film is pressed to form thickness changes, i.e. small pits, on it. For reproducing the recorded signal a laser light is irradiated on the disk, thereby interference of light between a light reflected at the surface of the thin film and a light reflected at the bottom of the same occurs, so that intensity of the resultant reflection light changes responding to the change of thickness or depth of the pits of the thin film.

A second prior art is disclosed in the Gazette of Japanese Unexamined Patent Publication Sho 52-114306 for the art of reflection type video disk. In this art, a light absorbing recording film is disposed on a substrate disk with a light reflecting film inbetween and the light absorbing recording film is at least partly evaporated or distorted at absorption of a laser light beam modulated by a signal thereby to form micro-pits.

The first prior art has an advantage that prerecorded disks can be easily mass-produced by mechanical pressing, but its disadvantage is that reproduction of the signal immediately after recording is not possible. The second prior art has not yet become into practical use because of difficulty of the forming a protection coating on its recording film due to the necessity of evaporation thereof.

Still another prior art is disclosed in U.S. Pat. No. 3,665,425 which uses a thin film of chalcogen compound as a recording media. Recording of a signal on the thin film is made by irradiating the film by a stronger laser light beam, so that the irradiated part is heated almost close to its melting point thereby to form voids at the irradiated portions. Reproduction of the signal is made by irradiating such a weaker laser light thereon so as not to further change the thin film, thereby detecting difference of light intensities between a light reflected from the portion including voids and a light reflected by the other portion. Due to light scattering at voids, the light reflected from the portion including the voids is weaker than that from the other part, and therefore a change of light intensity is produced. This art has the disadvantages that its output signal namely change of reflected light, is small; and also that detection of the scattered light is difficult because of very weak light intensity.

SUMMARY OF THE INVENTION

The present invention provides a novel method of recording and reproducing information on and from an optical thin film as recording media. The recording on the thin film is made by irradiating an optically sensitive thin film with a focussed light thereby changing its refractive index and light absorption coefficient at the irradiated region. The reproducing of the recorded information is made by irradiating said recorded region with another focussed light thereby making interference between lights reflected by both incident surface and the inside face of the opposite surface of the thin film.

The information recording system in accordance with the present invention has a feature that thickness of the thin film used for optical recording is selected in relation to the refractive index, absorption coefficient and wavelength of light used for reproducing, so that a highly efficient reproducing utilizing interference of the reflected light from the thin film can be realized.

The system in accordance with the present invention has the advantages of (1) enabling very fast speed recording and immediate reproducing of highly dense information,
(2) enabling such an efficient optical reproduction of the information as attaining as large value as 20% in the absolute value of variation of apparent reflection of light from the thin film, and
(3) enabling selection from both of positive and negative polarity of the variation of the apparent reflection of light with respect to information recording by increases of refractive index and coefficient.

Furthermore, since no substantial variation is made of the geometrical features of the thin film, the optically sensitive thin film can be protected by putting it between a substrate plate and a protection film, thereby a durable and easy-to-handle recording sheet is obtainable.

DESCRIPTION OF PREFERRED EMBODIMENTS

A system of recording and reproducing information in accordance with the present invention applies a monochromatic focussed light on a thin film as a writing light and as a reading light, wherein in the recording process the intensity of said writing light is modulated by an information and in reproducing process reflected light intensity sequentially varies by the written signal bits on the film, and the system is characterized in that said thin film changes its absorption coefficient and refractive index at thermal stimulation by light energy absorbed therein, and that thickness of said thin film is selected to have such a thickness which makes, for said reading light, an interference of a light reflected by a light-incident surface with a light reflected by an inside face of the opposite surface to said light-incident surface, thereby to make a large difference between reflections of light at parts where light absorption coefficient and refractive index have changed by irradiation of light and reflections of light at parts where light absorption coefficient and refractive index have not changed.

A method of recording information in accordance with the present invention comprises the steps of modulating intensity of a monochromatic light by an information in a manner that the modulated monochromatic light has at least a higher level part in time sequence, focussing said light to form a focussed light and sweeping it along a track on a thin film, characterized in that said thin film is that which changes light absorption coefficient refractive index at stimulation by a light irradiation, and that said focussed light has an intensity level which is higher than a threshold level, to change said light absorption coefficient and refractive index at said higher level.

On the other hand, a method of reproducing information in accordance with the present invention comprises the steps of producing a monochromatic light, focussing said monochromatic light to form a focussed light and applying it on a recorded thin film characterized by said focussed light having an intensity sufficiently lower than a threshold level to change light absorption coefficient and refractive index of said thin film and a light component reflected by a light incident surface of said thin film interfering with the other light component reflected by an inside face of the opposite surface to said light-incident surface of the thin film, thereby to form a resultant reflection light.

Principle of the invention will be elucidated referring to FIGS. 1, 2, 3, 4, 5 and 6.

Figure 1:
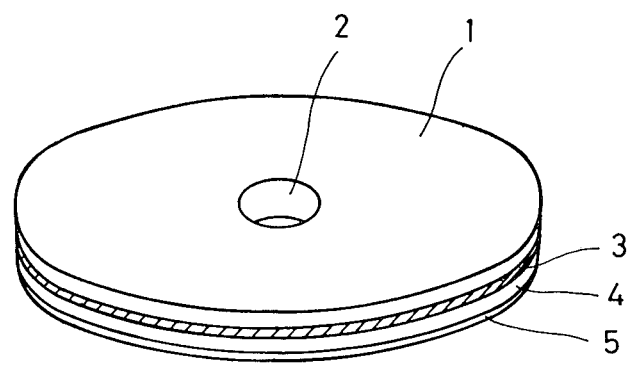
FIG. 1 is a perspective view of an example of a recording disk for the present invention.

FIG. 1 schematically shows constructions of a recording disk to be used in the present invention, wherein a thin film 3 in which information is recorded is disposed on a transparent disk-shaped substrate 1. A protection film 4 is provided on the thin film 3, and a label 5 is further provided on the protection film 4. A center hole 2 is provided to install the disk in a recording apparatus or in a reproducing apparatus.

For the substrate 1, a plate which is transparent and optically homogeneous with highly parallel and flat surfaces is used. Suitable material for the substrate 1 is a glass, such as soda-lime glass, quartz or heat durable glass, or plastics such as acryl resin, vinyl chloride or ABS resine, or transparent plastic sheet or plate of polyester or acetatefluorocarbon copolymer. For the material of the recording thin film 3, a compound of light-absorbing sub-oxide of metal or semi metal, for example, a compound consisting principally of $TeO_{x1}$ ($0 < x1 < 2.0$) and sensitized by $PbO_{x3}$ ($0 < x3 < 1.0$) disclosed in the U.S. Pat. No. 3,971,874 (Ohta et al) is suitable. The protection film 4 can be a vacuum-deposited aluminum film which also serves as a reflection film.

For the protection film 4, for example, a vacuum-deposited aluminum layer of preferably over 300 Å, backed by suitable plastic coating for protection is suitable. For a thickness of the aluminum layer of under 300 Å, the reflection is not sufficient.

PRINCIPLE OF RECORDING

Figure 2:
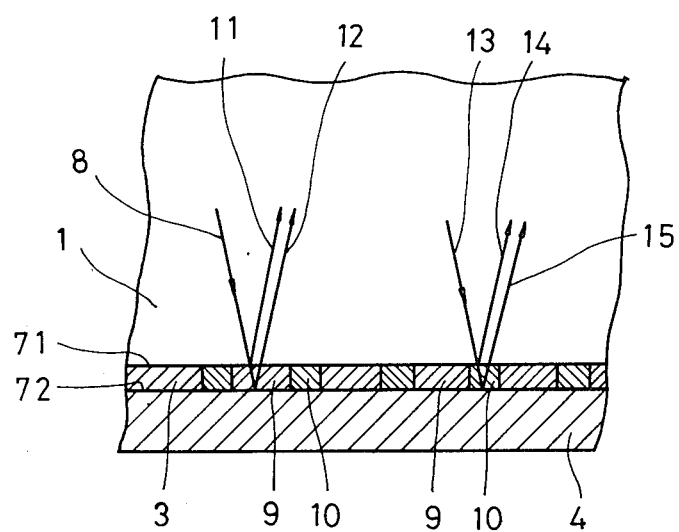
FIG. 2 is a sectional view of the recording disk for illustrating principle of the present invention.
Figure 3:
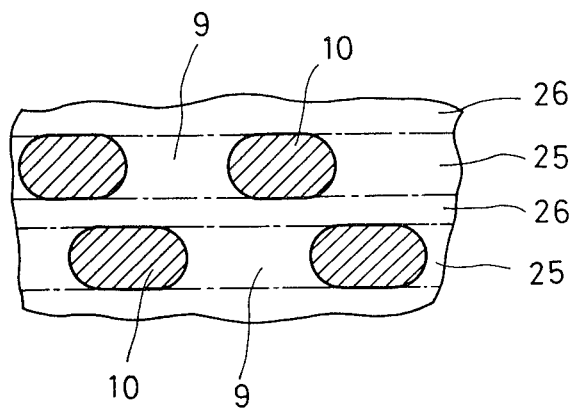
FIG. 3 is an enlarged plan view of a part of a thin film recording media.

The recording of the information on the thin film is made by striking a track on the thin film by a focussed monochromatic light of a known source, such as a focussed laser beam or suitable focussed light beam of a known monochromatic light source. By striking the thin film with the focussed light beam, a certain part of light energy is absorbed by the thin film 3, since the thin film has its own absorption of light. When such absorbed energy exceeds a specified recording threshold level, then irradiated parts undergo a physical change. By utilizing, for example a thin film of a solid solution principally comprising $TeO_{x1}$, wherein x1 is $0 < x1 < 2.0$, and sensitized by $PbO_{x3}$ wherein x3 is $0 < x3 < 1.0$, at the irradiation of a laser light of a predetermined intensity, refractive index of the thin film can be changed from 2.2 to 2.6 and also absorption coefficient thereof can be changed from $1.2 \times 10^5$ cm$^{-1}$ to $2 \times 10^5$ cm$^{-1}$. By means of such change of the optical constants, the information is recorded on the thin film. FIG. 2 shows schematic sectional views of the recorded disk and FIG. 3 shows an enlarged plan view of the recorded disk, where numerals 10, 10 designate recorded, hence physically changed parts, numerals 9, 9 designate the part, which is not physically changed, numerals 25, 25 designate recording tracks and numerals 26, 26 designate spaces, respectively. In the recording, it is preferable for the power efficiency to select wavelength of the monochromatic light in a manner that light reflected by the light-incident surface and the inside face of the opposite surface of the thin film interfere with each other in offsetting manner. Such offsetting condition is given when the following equation is fully or roughly satisfied:

$$n = (2q + 1) \frac{\lambda}{4d} \quad (1)$$

where
n: refractive index of the thin film,
d: thickness of the thin film,
λ: wavelength of the monochromatic light,
q: positive integer.

PRINCIPLE OF REPRODUCING

The reproducing of the optically recorded data in the thin film 3 is made by the following way:

When monochromatic incident light beams 8 and 13 strike the non-recorded part 9 and recorded part 10, respectively, reflections at the incident surface 71 make reflection lights 11 and 14, and reflections at the inside face 72 (bottom face) of the opposite surface make reflection lights 12 and 15, respectively. And the pairs of reflection lights 11 and 12, as well as, reflection lights 14 and 15 interfere with each other. Therefore, by the difference of the refractive indexes of the recorded part 10 and the non-recorded part 9, the result of the interference can be changed, so as to change intensities of the resultant reflection lights of these two parts from each other.

Provided that:
d designates the thickness of the thin film both at the recorded part 10 and the non-recorded part 9, in other words, provided that the physical differences are only in the refractive index and light absorption coefficient, but not in the thickness, and also provided that $R_1$ and $R_2$ designate the reflections of ligh for the non-recorded part and the recorded part, respectively, and $\alpha_1$ and $\alpha_2$ designate the light absorption coefficients for the non-recorded part and the recorded part, respectively, then the belowmentioned relations exist.

In general, when the equation $$2n_j d = (\lambda/2) + m\lambda \quad (2)$$

holds (wherein $n_j$ is the refractive index of the part and $\lambda$ is the light wavelength), the phases of the reflection lights reflected by the light-incident surface and the opposite face differs by $\pi$ radian, and hence the reflection lights offset each other, and therefore, reflection $R_j$ of the part is low. On the other hand, when the equation $$2n_j d = m\lambda \quad (3)$$

holds, the phases of the reflection lights reflected by the incident surface and the opposite face become the same, and hence the resultant reflection lights becomes the sum of the two component reflection lights, and therefore, the reflection $R_j$ of the part is high.

Namely, as a result of interference of the reflection lights from the incident face and the opposite face, the resultant reflection lights has minimum intensities (namely, the reflection lights 11 and 12 offset each other and the reflection lights 14 and 15 offset each other), when the following equations substantially hold at the respective parts:

$$\left. \begin{array}{l} n_1 = (2m + 1)\frac{\lambda}{4d} \quad \text{or} \\ n_2 = (2m' + 1)\frac{\lambda}{4d} \end{array} \right\} \quad (4)$$

where
m and m' are positive integers, and
the resultant reflection lights have maximum intensities (namely, the reflection lights 11 and 12 boost each other and the reflection lights 14 and 15 boost each other,) when the following equation substantially holds at the respective parts:

$$\left. \begin{array}{l} n_1 = 2m \cdot \frac{\lambda}{4d} \quad \text{or} \\ n_2 = 2m' \frac{\lambda}{4d} \end{array} \right\} \quad (5).$$

Therefore, by making the refractive indexes $n_1$ and $n_2$ for non-recorded and recorded parts 9 and 10 to have such pair of:

$$\left. \begin{array}{l} n_1 = (2m + 1) \cdot \frac{\lambda}{4d} \quad \text{and} \\ n_2 = 2m' \cdot \frac{\lambda}{4d} \end{array} \right\} \quad (6),$$

the resultant reflection light at the non-recorded part 9 becomes minimum, and the resultant reflection light at the recorded part 10 becomes maximum.

Alternatively, by selecting the refractive indexes so as to make the other pair of:

$$\left. \begin{array}{l} n_1 = 2m \cdot \frac{\lambda}{4d} \quad \text{and} \\ n_2 = (2m' + 1)\frac{\lambda}{4d} \end{array} \right\} \quad (7),$$

the resultant reflection light at the non-recorded part 9 becomes maximum, and the resultant reflection light at the recorded part 10 becomes minimum. Thus, in both cases of the abovementioned selections (6) and (7), contrast between the intensities of the recorded part 10 and the non-recorded part 11, or in other words, difference $\Delta R$ between the reflections $R_1$ and $R_2$, can be maximum. Furthermore, by selecting either case of the abovementioned two cases of the equations (6) and (7), the polarity of the difference $\Delta R$ can be selected as desired. Namely, the polarity of $\Delta R$ can be selected by selecting relations between the thickness and the refractive indexes.

Figure 7:
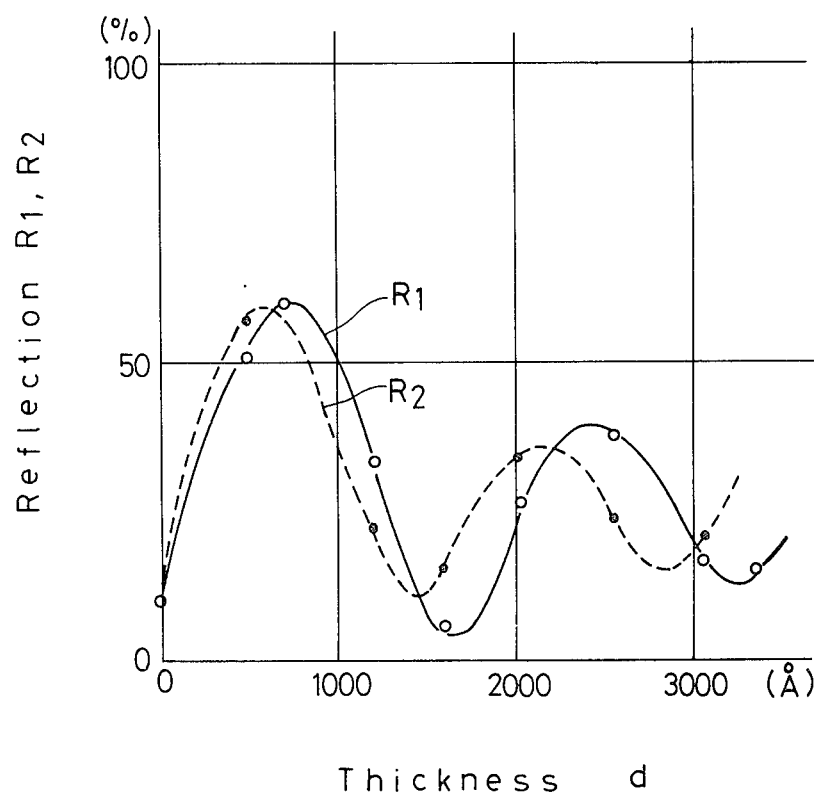
FIG. 7 is a graph showing relations between film thickness and reflections of a recording thin film.

Now, let us further consider the effect of the absorption coefficients $\alpha_1$ and $\alpha_2$ of the thin film 3. In a thin film having absorption coefficients $\alpha_1$ and $\alpha_2$, the reflections $R_1$ and $R_2$ oscillatingly vary as thickness d varies as shown in FIG. 7. This can be elucidated by adopting complex refractive indexes $\eta_1$ and $\eta_2$:

$$\left. \begin{array}{l} \eta_1 = n_1 + ik_1 \quad \text{and} \\ \eta_2 = n_2 + ik_2 \end{array} \right\} \quad (8)$$

where $k_1$ and $k_2$ are extinction coefficients and are represented by the equation $$\left. \begin{array}{l} k_1 = \frac{\lambda}{4\pi} \cdot \alpha_1 \quad \text{and} \\ k_2 = \frac{\lambda}{4\pi} \cdot \alpha_2 \end{array} \right\} \quad (9).$$

Generally speaking, the oscillation amplitudes of the values of reflections $R_1$ and $R_2$ attenuate as the thickness d of the thin film 3 increases. This is due to the absorptions of the thin film 3. In order to effectively utilize the effect of the interference of light, the light absorption coefficient should be under $5 \times 10^5$ cm$^{-1}$.

In case the thin film 3 is very thin, by applying a reflection film 4 of a very high reflection on the rear face of the thin film 3, the effect of the difference between the absorption coefficients $\alpha_1$ and $\alpha_2$ becomes predominant over the difference between the refractive indexes $n_1$ and $n_2$. Since the recorded parts have a considerably large absorption coefficient, the reflection light reflected by the inside face 72 of the thin film 3 is considerably weak, so that the intensity of the reflection light by the incident face 71 and that by the inside face 72 can be selected to be equal. Therefore, when the recording is made to such polarity as to offset both the reflection lights by interference, then in a reproducing by striking a weaker laser light beam focussed on the same recorded part, the resultant reflected light has an extremely low intensity at the recorded part i.e., a large reflection difference $\Delta R = (R_2 - R_1)$. And hence, a very wide dynamic range of the reproduced light is obtainable. In other words, by suitably selecting the thickness of the thin film, a high signal to noise ratio can be obtained.

It is to be noted that in the reproducing of the recorded information, the energy intensity should be selected to such a level that does not cause the light energy absorbed by the recorded area, which has an increased absorption, to exceed recording threshold level of the thin film. In practical uses, the energy density of the light beam spot to trace the recording track should be about 10% or lower of that used for the recording. Because, with such low energy of light beam, there is no fear of exceeding the recording threshold level hence making erroneous recording.

Figure 4:
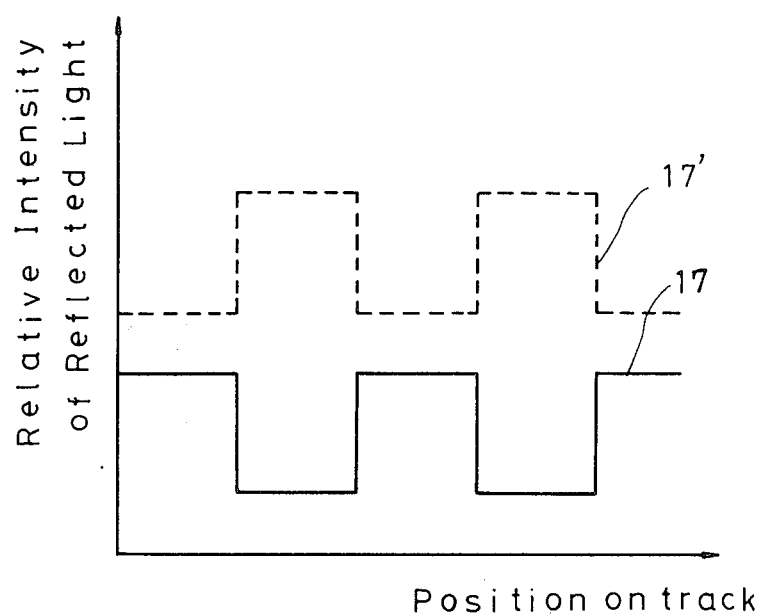
FIG. 4 is a graph showing the relation between positions on a track and relative intensity of reflected light.

FIG. 4 shows examples of relations between the position on a track and relative intensity difference $\Delta R$ of reflected light. The solid curve 17 shows a case (of a negative polarity) where the reflected light intensity is lower in the recorded part than in the non-recorded part. The dotted curve 17' shows another case (of a positive polarity) where the reflected light intensity is higher in the recorded part than in the non-recorded part. Either curve can be selected, as abovementioned, by selecting the relation between the film thickness d, refractive indexes $n_1$ and $n_2$ and the absorption coefficients $\alpha_1$ and $\alpha_2$.

Figure 5:
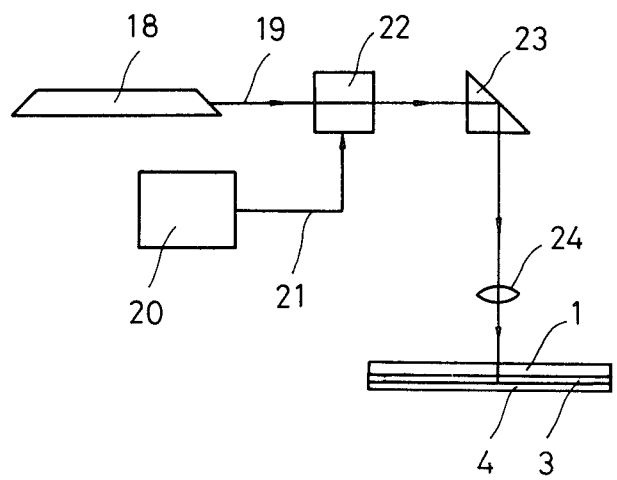
FIG. 5 is a schematic view showing an apparatus for recording in accordance with the present invention.

FIG. 5 gives a schematic illustration of an example of an apparatus for recording the information in accordance with the present invention. A laser 18 emanates a light beam 19 to a light-modulator 22 where the laser light beam 19 is amplitude-modulated by a modulating signal given from a data processor 20 through L line 21. For the laser 18, a He-Ne laser of wavelength of 6328 Å, He-Cd laser of wavelength of 4416 Å an, Ar laser of wavelength of 5145 Å or semiconductor laser of a wavelength of 8200 Å can be used. The modulated laser light beam passes through a mirror 23, is focussed by a lens 24, and strikes a thin film 3 formed on the rear face of a transparent and highly parallel-face-finished substrate plate 1 therethrough. When the recording disk, which consists of the substrate 1, thin film 3 on a reflection and protection film 4, rotates relatively to the focussed laser beam at a predetermined speed, information data such as data bits are stored in the thin film.

An example of the recording is as follows:
recording disk has diameter of 20 cm,
recording disk rotates at speed of 1800 rpm,
their film 3 is $(TeO_{x1})_{1-z}(PbO_{x3})_z$; ($0 < x1 < 2.0$, $0 < x3 < 1.0, 0 < z < 0.5$) thickness of 1700 Å
non-recorded parts: $n_1 = 2.2$, $\alpha_1 = 1.2 \times 10^5$ cm$^{-1}$,
recorded parts: $n_2 = 2.6$, $\alpha_2 = 2 \times 10^5$ cm$^1$,
recording laser light: $\lambda = 8200$ Å
recording focussed spot: diameter of 1.4 μm
recording energy density: 40 m Joule/cm$^2$.

Figure 6:
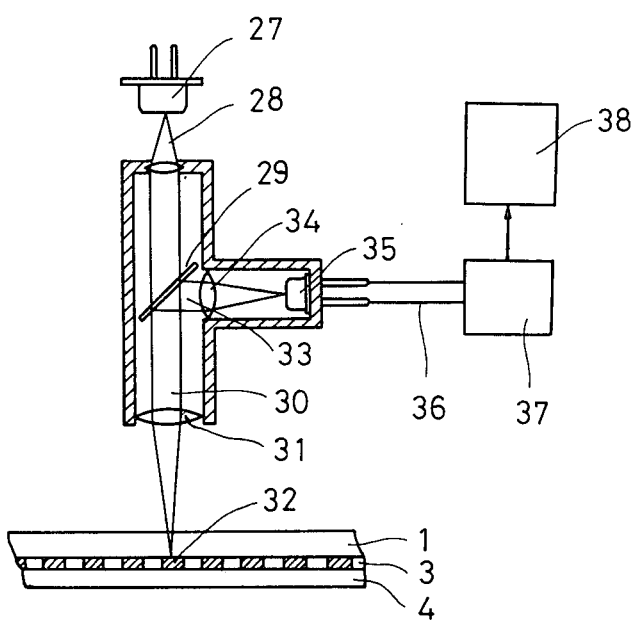
FIG. 6 is a schematic view showing an apparatus for reproducing a signal in accordance with the present invention.

FIG. 6 gives a schematic illustration of an example of an apparatus for reproducing the information in accordance with the present invention. The reproducing is made by utilizing changes of refractive indexes $n_1$ and $n_2$, as well as, absorption coefficient $\alpha_1$ and $\alpha_2$. A substantially monochromatic light source, for example, a semiconductor laser 27 is used for a light source of a reading light beam 28. The light beam 28 passes through a half-mirror 29 and is focussed by a lens 31 on a thin film 3 through a transparent substrate 1. The reflected light from the thin film 3 travels back to the half-mirror 29 and reflected by it. The light 33 reflected by the half-mirror 29 is focussed by a lens 34 on a photoelectric cell 35, for example, a photo-transistor. The photoelectric-transduced electric output signal 36 of the photo-transistor 35 is led through an amplifier to a data processor 38 which reproduces the recorded information. As the reflected light, an amplitude-modulated light by a modulation ratio of 50% to 70% can be obtained, and therefore by photoelectrically transducing it a signal of good S/N ratio is obtainable. Polarity of the output signal can be selected by varying relation between the wavelength of the light, the thickness and refractive indexes of the thin film 3.

In the information recording system of the present invention, when the $\Delta R = R_2 - R_1$, which is the difference between the reflection $R_2$ of the recorded part and that $R_1$ of the nonrecorded part, is selected to be a positive value, then the resultant reflected light intensity from the recorded part is stronger than that from the non-recorded part, and therefore, the recorded information can be reproduced with a good S/N ratio even by using a considerably weak reading light, which is nearly at the threshold level of the detection of the photoelectric detector. This is especially so when a recording of an analogue signal is made.

On the other hand, when the $\Delta R$ is selected to be a negative value, then the resultant reflected light intensity from the non-recorded part is stronger than that from the recorded part, and therefore, the recorded information can be reproduced with a good S/N ratio when using a considerably strong reading light. This is especially so when a recording of an analogue signal is made.

PRINCIPLE OF ERASING

Also in this case of using a negative value $\Delta R$, erasing of the recorded information can be made easily by further irradiating the desired part of the track with a light beam of a predetermined energy level which is slightly lower than the recording threshold level. The reason for this easy erasing is as follows: Suboxide thin film e.g. consisting mainly of $TeO_{x1}$ has the nature that the recording is made by absorbing irradiated light with an energy level which is a energy region, between the recording threshold level and the erasing threshold level say 100 and 120 in relative values, and the recording is not made at absorbing light under the energy level of the recording threshold level, say under the level of 100, and that the recorded information is erased at absorbing a light energy which exceeds the level of the erasing threshold level, (say, a light energy exceeding the level 120). Since the recorded part in this $\Delta R < 0$ type recording case has a high absorption $\alpha_2$, and therefore, when the abovementioned light beam of slightly lower energy level than that used in the recording is applied on the thin film, then due to the high absorption coefficient of light and decreased reflection, the light energy absorbed at the recorded part becomes considerably high and exceeds the abovementioned erasing threshold level (namely the level 120 for the example), and hence the recorded information is erased, and no recording is made for the non-recorded part which has a low absorption due to the slightly lower energy level than the recording threshold level.

To illustrate these statements assume, for example, a film of 1200 Å in thickness is employed, which has a transmittance T=20% and reflection R=30% before recording. After recording, T and R become 10% and 15% respectively. A utility factor A (defined hereafter) before recording is 100−(R+T)=50%. This utility factor A increases to 75% after recording. Thus, the recorded (denatured) regions would have a utility factor 1.5 times larger than that for the non-denatured regions. This means that if the recorded regions were irradiated with a power intensity as high as that used in the recording step, the energy level due to absorption in the recorded regions because of the altered utility factor would increase 1.5 times (i.e. $100 \times 1.5 = 150$), well above the erasing energy level 120. Accordingly, it would only be necessary to irradiate the film with a light beam having an intensity of above 80% ($120/1.5 = 80$) of that of the recording power level for the recorded regions to absorb energy more than 120 so that erasing can be accomplished. Thus, it is in this manner that the high absorption coefficient of light and decreased reflection enable erasing with a light beam of an energy level which is slightly lower than the recording threshold level.

EXAMPLE 1

For a thin film 3 formed on a substrate 1 of the recording disk, a compound principally consisting of $TeO_{x1}$, wherein $0 < x1 < 2.0$, is used. For the substrate 1, an acryl resin disk of the thickness of 1.0 mm with very flat parallel faces is used, and the thin film 3 is formed on the substrate 1 by a known vapor deposition method. In this example, there is no particular reflection film is provided on the back face 72 of the thin film. The thickness of the thin film 3 can be desirably controlled by the deposition time and amount of solid solution of the compound, and the effect of the thickness is discussed in detail in the following.

FIG. 7 is a graph showing curves of changes of the reflections $R_1$ and $R_2$ of the thin film 3 in relation to the change of film thickness d, for the non-recorded part and recorded part, respectively. The light source used for the information reproducing is a He-Ne laser and the wavelength is 6328 Å.

The abovementioned thin film generally shows pale brown appearance, but depending on the thickness reflected light is observed as blue, green, red or reddish color.

When the measurements of the reflections $R_1$ and $R_2$ are made by using a light of longer wavelength, for example, by using the light of the wavelength of 8200 Å, then the reflection-film thickness curve shows a waving of longer period of the film thickness, namely the curves vary as if extended towards the direction of larger film thickness. The peaks of the curves correspond to each-other-boosting of the reflections from the incident surface and the inside face of the other surface, and the valleys of the curves correspond to each-other-offsetting of the reflections. By a recording, in general, the refractive index of the thin film 3 increases and the characteristic curve of the reflection changes from the curve $R_1$ to the curve $R_2$, as if the curve shrinks towards the side of smaller thickness in the graph. The reproducing of the information is made by detection of the difference between the reflected lights due to the difference $\Delta R = R_2 - R_1$ for the thickness of the thin film used. For instance, in this example wherein the wavelength $\lambda$ is 6328 Å, a negative value of $\Delta R$ is obtainable for the following cases:

(1) d = 800 Å to 1400 Å, and
(2) d = 2200 Å to 3000 Å

On the other hand, for the following regions of the thickness, a positive value of $\Delta R$ is obtainable:

(3) d = up to 500 Å, and
(4) d = 1600 Å to 2200 Å.

Namely by selecting the relation of thickness of the thin film and the wavelength, the polarity of R can be selected and the $\Delta R = |R_2 - R_1|$ of more than 20% is obtainable.

It is practically acceptable when utility factor A defined by $$A = \frac{\text{light energy absorbed in the thin film}}{\text{light energy incident on the thin film}} \times 100 \, (\%) \quad (10)$$

of irradiated light incident to the thin film 3 is from 60% to 95%. On the other hand, the utility factor A is also represented by $$A = 100 - (R + T) \, (\%) \quad (11)$$

wherein R is reflection and T is transmittance. Both of the reflection R and the transmittance T bring loss of light. In order to obtain the abovementioned utility factor of 60% to 95%, from the curves of FIG. 7, the thickness should be 1200 Å to 1400 Å. In the region of such film thickness, the reflection R is 5% to 40% and the transmittance T is 30% to 0%, and hence the utility factor becomes 60% to 95%. In such region, the recording sensitivity is good, and especially for the thickness of d = 1700 Å, the $\Delta R$ is positive and the value of $\Delta R = 23\%$ is obtainable.

When a thin film of the thickness of 2600 Å is used, then the $\Delta R$ becomes negative and the value is $\Delta R = -17(\%)$, and the value is practical for recording on thin film.

EXAMPLE 2

This second example is provided with a reflection film 4 on the back face which is opposite to light incident face of the thin film 3. Such reflection film is preferable, especially for the case that the thickness of the thin film is very small and hence its transmittance is over 50%.

For a substrate 1, an acryl resin disk of the thickness of 1.0 mm with very flat parallel faces is used, and a thin film 3 mainly consisting of $TeO_{x1}$ wherein $0 < x1 < 2.0$ is formed on the substrate 1 by a known vapor deposition method. A reflection film 4 of vapor-deposited aluminum of 300 Å or more is disposed on the opposite face 72 to a light incident face 71 of the thin film 3. Further on the back face of the reflection film 4, a resin film for protection purpose may be provided.

Figure 8:
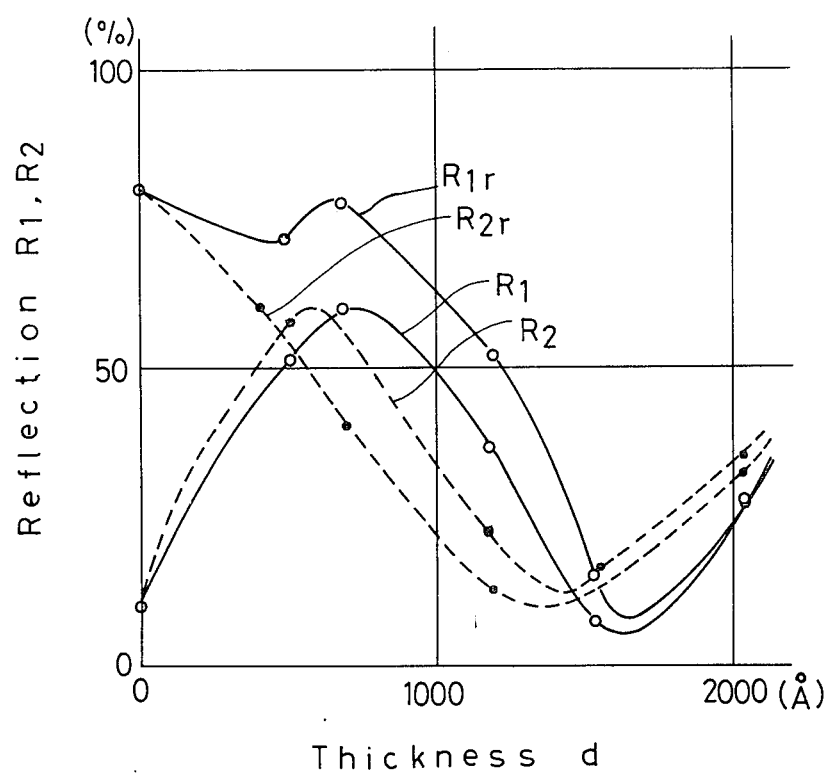
FIG. 8 is a graph showing relations between film thickness and reflections when a light reflecting film is provided on the back face of a thin recording film.

FIG. 8 is a graph showing curves of changes of the reflections $R_{1\gamma}$ and $R_{2\gamma}$ of the thin film 3 of this Example in relation to the change of film thickness d, for the non-recorded part and the recorded part, respectively. The curves $R_1$ and $R_2$ are the corresponding reflections of the previous Examples where no reflection film is provided, shown for a comparison.

In this Example, as the film thickness increases in the very thin region, the curve $R_{1\gamma}$ for the reflection of the non-recorded part decreases, thereby nearing to the curve $R_1$. It is to be noted that, in this Example, the curve $R_{2\gamma}$ for the recorded part is lower than the curve $R_{1\gamma}$ for such a wide region as up to 1500 Å of the thickness d. In other words, for the very wide region of d, the $\Delta R = R_2 - R_1$ is negative, and furthermore, the absolute value of $\Delta R$ is also so large as over 30%. Therefore, an efficient reproduction of information is possible for a wide range of the film thickness.

What is claimed is:

1. A method of erasing information optically recorded in a thin recording film in the form of a distribution of thermally denatured regions therein on a recording disc substrate comprising the steps of
producing a monochromatic light beam,
focussing said monochromatic light beam to form a focussed light spot beam on said thin recording film,
sweeping said focussed light spot beam relative to and on a front surface of said thin recording film with a light intensity that light absorption in said thermally denatured regions gives a higher energy level than a recording intensity threshold level for having changed a light absorption coefficient and a refractive index of non-denatured regions in said thin recording film, and
applying said focussed light spot beam on said thin recording film, thereby producing an apparent reflection from said thin recording film resulting from an interference between reflection light from a light-incident face of said thin recording film and another reflection light from a bottom face thereof which is smaller at said denatured regions than at said non-denatured regions,
the applying of said focussed light spot beam being done with a light intensity level lower than said recording threshold level and with an intensity level such that, when absorbed at said denatured regions having a decreased reflection and an increased light absorption coefficient, the absorbed energy levels at said denatured regions are caused to exceed a predetermined erasing intensity threshold level which is higher than said recording threshold level.

2. A system of erasing information data optically stored in a thin recording film in the form of a distribution of thermally denatured regions therein comprising:
a light source for generating a monochromatic light beam,
a recording disc substrate coated with a thin recording film,
a condensing means for condensing said monochromatic light beam on said thin recording film, said condensing means being disposed in a light path between said light source and said recording disc substrate,
said thin recording film having a thermally denatured nature upon light irradiation, and comprising denatured regions which are formed by light irradiation with a first light intensity level and which correspond to information data stored by the light irradiation with said first light intensity level,
a driving means for sweeping the condensed monochromatic light beam relative to and on a front surface of said thin recording film with a light intensity such that light absorption in said thermally denatured regions gives a higher energy level than a recording intensity threshold level for having changed a light absorption coefficient and a refractive index of non-denatured regions in said thin recording film, and for applying said condensed monochromatic light beam on said thin recording film, thereby producing an apparent reflection from said thin recording film resulting from an interference between reflection light from a light-incident face of said thin recording film and another reflection light from a bottom face thereof which is smaller at said denatured regions than at said non-denatured regions,
the applying of said condensed monochromatic light beam being done with a light intensity level lower than said recording threshold level and with an intensity level such that, when absorbed at said denatured regions having a decreased reflection and in increased light absorption coefficient, the absorbed energy levels at said denatured regions are caused to exceed a predetermined erasing intensity threshold level which is higher than said recording threshold level.

3. A system of recording information in a recording disc comprising:
a light source for generating a signal-modulated monochromatic light beam,
a recording disc substrate coated with a thin recording film, and
a condensing means for condensing the modulated light beam on said thin recording film, said condensing means being disposed in said light path and between said light source and said recording disc substrate,
said thin recording film having thermally denaturing nature upon light irradiation, having a first complex refractive index $\eta_1$ for non-denatured regions in the recording film and a second complex refractive index 2 for thermally denatured regions in said recording film by said light irradiation, and having a uniform thickness before and after said light irradiation,
said uniform thickness being between a first film thickness $d_1$ which satisfies a first condition and a second film thickness $d_2$ which satisfies a second condition,
said first condition being that a reflection light intensity for said non-denatured regions is minimum in an interference relationship of first reflection light from a light-incident front surface of said thin recording film and second reflection light from a bottom face of said thin recording film interfered with each other,
said second condition being that another reflection light intensity for said denatured regions is maximum in said interference relationship.

4. A method of reproducing information comprising the steps of producing a monochromatic light beam, focussing said monochromatic light beam to form a focussed light spot beam, and sweeping it on a thin recording film with an intensity sufficiently lower than an intensity threshold level for changing an absorption coefficient of light and a refractive index of said thin recording film,
producing interference reflection light between reflection light from a light-incident surface of said thin recording film and another reflection light from a bottom face thereof, and
transducing said interference reflection light photoelectrically thereby generating an electric signal.

5. A method of reproducing information in accordance with claim 4, wherein the sweeping of said focussed spot beam is done with a wavelength so as to make an apparent reflection from said thin recording film resulted by said interference smaller at denatured regions than that at non-denatured regions.

6. A method of reproducing information in accordance with claim 4, wherein the sweeping of said focussed spot beam is done with a wavelength so as to make an apparent reflection from said thin recording film resulted by said interference larger at denatured regions than that at non-denatured regions.

7. A method of recording information in a thin recording film comprising the steps of modulating an intensity of a monochromatic light beam by information data in a manner that the modulated monochromatic light beam has at least a higher level part in time sequence so as to produce thermally denatured regions in said thin recording film, focussing said modulated light beam to form a focussed light spot beam on said thin recording film, said sweeping said focussed light spot beam on said thin recording film, thereby changing a light absorption coefficient and a refractive index at stimulation by said focussed light spot beam irradiation with an intensity which is higher than an intensity threshold level for changing said light absorption coefficient and said refractive index.

8. A method of recording information in a thin recording film in accordance with claim 7, wherein the sweeping of said focussed light beam spot is made in such a manner that an apparent reflection resulting from an interference between light from an incident front face of said thin recording film and another light from a bottom face thereof, is larger at said thermally denatured regions in said thin recording film than another reflection at said non-denatured regions.

9. A method of recording information in accordance with claim 7, wherein the sweeping of said focussed light spot beam is made in such a manner than an intensity of reflected light at said non-denatured regions to be 5% to 40% of incident light thereto, and that an intensity of absorbed light by said thin recording film therein is 60% to 95% of said incident light.

10. A method of recording information in a thin recording film in accordance with claim 7, wherein the sweeping of said focussed light beam spot is made in such a manner that an apparent reflection resulting from an interference between light from an incident front face of said thin recording film and another light from a bottom face thereof, is smaller at said thermally denatured regions in said thin recording film than another reflection at said non-denatured regions.

11. A method of recording information in accordance with claim 10, wherein the sweeping of said focussed light spot beam is made for said thin film has a transmittance of over 50% and a reflection film layer is provided on said bottom surface.

12. A system of recording information in a recording disc comprising:
a light source for generating a monochromatic light beam,
a recording disc substrate coated with a thin recording film,
a light modulator for modulating said monochromatic light beam responding to information data, said light modulator being disposed in a light path between said light source and said recording disc substrate, and
a condensing means for condensing the modulated light beam on said thin recording film, said condensing means being disposed in said light path and between said light modulator and said recording disc substrate,
said thin recording film having a thermally denaturing nature upon light irradiation, having a first complex refractive index $\eta_1$ for non-denatured regions in the recording film and a second complex refractive index $\eta_2$ for thermally denatured regions in said recording film by said light irradiation, and having a uniform thickness $d_1$ before and after said light irradiation,
said uniform thickness being between a first film thickness $d_1$ which satisfies a first condition and a second film thickness $d_2$ which satisfies a second condition,
said first condition being that a reflection light intensity for said non-denatured regions is mininum in an interference relationship of first reflection light from a light-incident front surface of said thin recording film and second reflection light from a bottom face of said thin recording film interfered with each other, and
said second condition being that another reflection light intensity for said denatured regions is maximum in said interference relationship.

13. A system of recording information in accordance with claim 12, wherein said thin recording film has a transmittance of over 50% and a reflection film layer is provided on said opposite surface.

14. A system of reproducing information stored in a recording disc comprising:
a light source for generating a monochromatic light beam,
a recording disc substrate coated with a thin recording film,
a first condensing means for condensing said monochromatic light beam on said thin recording film, said first condensing means being disposed in a first light path between said light source and said recording disc substrate,
a second condensing means for condensing an interference reflection light, said second condensing means being disposed in a second light path between said thin recording film and a detection means for detecting said interference reflection light beam after it is condensed by said second condensing means,
a signal processing means for processing an output signal from said detection means,
said thin recording film comprising thermally denatured regions and non-denatured regions in said thin recording film on said recording disc substrate,
said thin recording film having a film thickness between a first thickness $d_1$ which satisfies a first condition for said non-denatured regions, and a second thickness $d_2$ which satisfies a second condition for said non-denatured regions, and a second thickness $d_2$ which satisfies a second condition for said denatured regions having a complex refractive index of $\eta_2$, said first condition being an offset interference relationship of first reflection light from a light-incident front surface of said thin recording film and second reflection light from a bottom face of said thin recording film interfered with each other thereby producing minimum reflection light intensities, and
said second condition being a boost interference relationship of said first reflection light and said second reflection light interfered with each other thereby producing maximum reflection light intensities.

15. A system of reproducing information stored in a recording disc in accordance with claim 14, wherein said wavelength of said monochromatic light beam is substantially equal to a wavelength of a monochromatic light beam which caused said denatured regions in said thin recording film.

16. A system of reproducing information stored in a recording disc in accordance with claim 14, wherein said thin film has a thickness satisfying a condition that an apparent reflection in said interference state is larger at said denatured regions than at said non-denatured regions.

17. A system of reproducing information stored in a recording disc in accordance with claim 14, wherein said thin film has a thickness satisfying a condition that an apparent reflection in said interference state is smaller at said denatured regions than at said non-denatured regions.

18. A system of reproducing information in accordance with claim 17, wherein said thin recording film has a transmittance of over 50% and a reflection film layer is provided on said bottom face.

19. A system of recording or reproducing information in accordance with claim 12 or 14, wherein said film thickness satisfies a condition that an intensity of reflected light from said non-denatured regions is 5% to 40% of light incident thereto, and that a light intensity absorbed in said thin recording film is 60% to 95% of said incident light.

* * * * *